Figure 1:
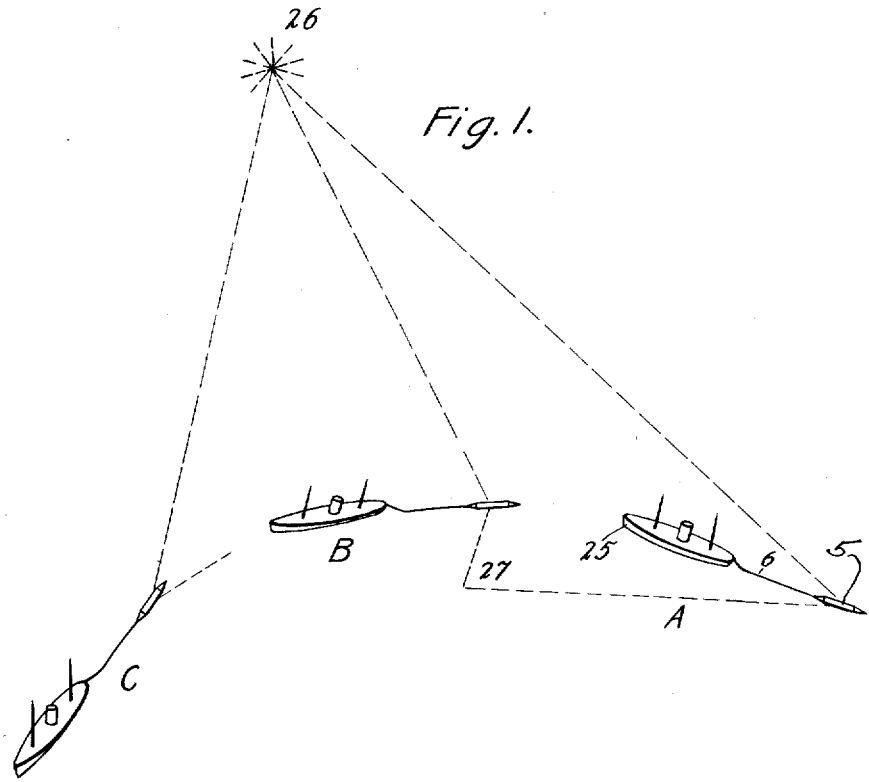

H. D. ARNOLD.
METHOD OF DETECTING UNDERWATER VIBRATIONS.
APPLICATION FILED JUNE 24, 1919.

1,383,690.

Patented July 5, 1921.

Inventor:
Harold De Forest Arnold.
by J. G. Roberts Att'y.

UNITED STATES PATENT OFFICE.

HAROLD D. ARNOLD, OF MAPLEWOOD, NEW JERSEY, ASSIGNOR TO WESTERN ELECTRIC COMPANY, INCORPORATED, OF NEW YORK, N. Y., A CORPORATION OF NEW YORK.

METHOD OF DETECTING UNDERWATER VIBRATIONS.

1,383,690.      Specification of Letters Patent.      Patented July 5, 1921.

Application filed June 24, 1919. Serial No. 306,384.

*To all whom it may concern:*

Be it known that I, HAROLD DE FOREST ARNOLD, a citizen of the United States, residing at Maplewood, in the county of Essex, State of New Jersey, have invented certain new and useful Improvements in Methods of Detecting Underwater Vibrations, of which the following is a full, clear, concise, and exact description.

This invention relates to a method of detecting under-water vibrations and more particularly to a method of determining the direction of a source of sound which is transmitting vibrations to a body of water.

In connection with submarine signaling and the detection of the presence of enemy craft in neighboring waters it is not only desirable to be able to clearly and accurately receive the vibrations transmitted but it is often of the greatest importance to be able to accurately locate the point from which the vibrations emanate. This is particularly true in connection with apparatus used in detecting the presence of enemy submarines where it is extremely important to know the exact location.

It has been proposed to determine the direction of under-water sound transmitting bodies by employing a pair of detectors mounted on opposite sides of the ship and depending upon the sound shadow cast by the bulk of the ship when the course is changed, to vary the volume of the signals received an amount sufficient to permit the observer to determine the location of the source of vibration. Such an arrangement, however, cannot be used satisfactorily when the ship is in motion because of the disturbing effects caused by the ship's machinery and the action of the propeller. It has been shown that these disturbances can be largely overcome by mounting the sound detecting apparatus on a device towed at a considerable distance behind the ship but with such an arrangement it has not been possible, heretofore, to determine the direction from whence the sound comes.

It is therefore the object of the present invention to provide a method for determining the direction of a source of under-water sound and one which will not be affected appreciably by disturbances occurring on the ship upon which the listening apparatus is carried. To accomplish this object, and in accordance with a feature of this invention, a pair of detectors are mounted on a device which is adapted to be towed some distance behind the ship upon which the listening tests are made and an apparatus is provided for listening to these detectors binaurally to determine the point from which the sounds emanate. Obviously, the same results will be obtained if the detectors are mounted on separate devices, so long as they are maintained a fixed distance apart, and under certain conditions it may be preferable to mount them in this manner.

Figure 2:
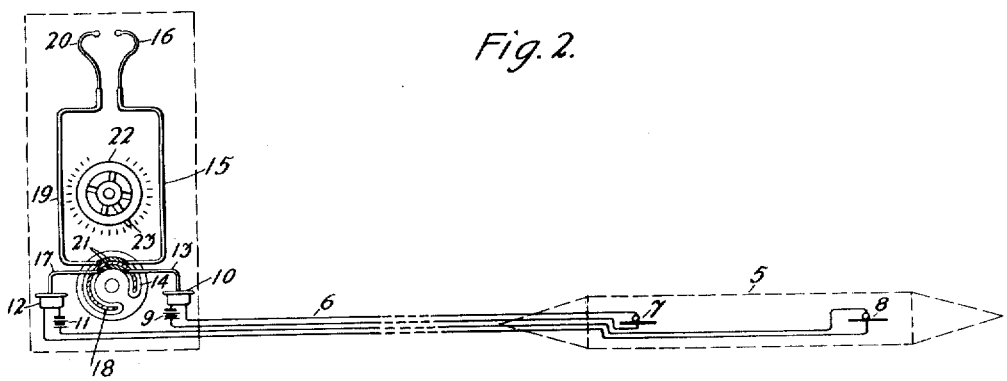

This and other features of the invention will be more clearly understood by reference to the accompanying drawing in which Figure 1 shows schematically the procedure followed in locating a source of sound and Fig. 2 shows the apparatus involved in making the necessary tests.

In the proposed method of detection, a towing device or fish 5 is towed by means of the cable 6 from the vessel upon which the listening apparatus is carried. Located within the fish 5, which preferably is built on stream lines for ease in towing, are two detectors 7 and 8 separated from each other a certain fixed distance. This cable 6 in addition to serving as a towing cable also contains electrical conductors by means of which the detector 7 is connected in series with a battery 9 and receiver 10, and the detector 8 is connected in series with the battery 11 and receiver 12. Sound generated in the receiver 10 is transmitted to one ear of the listener by means of the fixed tube 13, adjustable tube 14, fixed tube 15 and stethescopic ear tube 16. Sound generated in the receiver 12 is transmitted to the other ear of the observer by means of the fixed tube 17, adjustable tube 18, fixed tube 19 and stethescopic ear tube 20. The adjustable tubes 14 and 18 are circular in form and reversed as shown, and are closed at the ends by means of the circular stops 21—21. These tubes are adapted to be rotated by means of the handle 22 while the stops 21 are held stationary, thus making it possible to increase the length of one tube and simultaneously decrease the length of the other tube. When rotated in a clockwise direction, the length of tube 14 is increased and the length of tube 18 is decreased. On the contrary, if rotated in an anti-clockwise direction, the length of tube 14 is decreased and that of tube 18 is increased. The observer, upon listening to the sounds picked up by the detectors, rotates the handle 22 and consequently the tubes 14 and 18 until a balance is obtained when the effect of the sound received in either ear is the same. The direction of the source of sound is then determined by the relative length of the ear paths from the two receivers. A pointer 23 located on the handle 22 is provided to indicate the comparative lengths of these ear paths and, as a result, the direction of the source of sound' from the base line joining the two detectors. With such a balance a certain ambiguity exists since two different directions are indicated each at the same angle with the base line, and it is therefore necessary to make a plurality of measurements to definitely determine the direction. The method of operating this apparatus in making a plurality of measurements is as follows:

With the ship 25 in position A, shown in Fig. 1, a binaural balance is first obtained in the manner described above from which it is determined that the direction of the source of sound is in one of the two directions indicated by the dotted lines. The ship 25 then alters its course slightly and a second balance is obtained for the position B. From this position the source of sound is determined as being in one of the two directions indicated by the dotted lines shown for that position. As a result of these two balances, it is known that the source of sound either comes from the point 26 or the point 27. As a rule only two balances are required since the observer with a little experience is able to predict the correct location. However, when necessary the ship 25 again changes its course slightly and a third balance is obtained, as at position C, indicating that the location of the source of sound is in one of the two positions shown by the dotted lines. From this third balance, it at once becomes definitely proven that the source of sound is located at the point 26.

With this method of detecting a source of sound, it has been found possible to eliminate certain of the difficulties heretofore experienced as a result of vibrations of ship's machinery, etc., and by changing the ship's course slightly and taking a plurality of balances to determine the exact location of the source of sound.

What is claimed is:

1. A method of detecting the direction of a source of sound which consists in towing a pair of detecting devices a fixed distance apart, obtaining a binaural balance, changing the course of the towing vessel, obtaining a second binaural balance and deducing from these balances the direction of the source of sound.

2. A method of detecting the direction of a source of under-water sound which consists in towing a pair of detectors spaced a fixed distance apart, obtaining a plurality of binaural balances when the towed device is traveling in different directions and deducing from these balances the direction of the source of sound.

3. A method for determining the location of a source of under-water sound which consists in towing a device including a pair of detectors behind a vessel, obtaining a binaural balance to determine the location of the source of sound as indicated from that position and from a plurality of such balances locating the direction of the source of sound.

4. A method for determining the location of a source of under-water sound which consists in towing a listening device equipped with a plurality of detectors spaced a fixed distance apart, obtaining a binaural balance, altering the course of the towing vessel and obtaining binaural balances until the position of the source of sound is determined.

5. In apparatus for detecting the direction of a source of under-water sound, the combination with a towing vessel of a detecting device comprising a pair of detectors spaced a fixed distance apart, a towing cable for towing said device from said vessel and means for obtaining a binaural balance between said detectors.

6. In apparatus for detecting the direction of a source of under-water sound, the combination with a towing vessel of a device to be towed, a pair of detectors mounted on said towing device and spaced a fixed distance apart and means for obtaining a binaural balance between said detectors when operated as a result of vibrations emanating from said source of sound.

7. In apparatus for detecting the direction of a source of under-water sound, the combination with a towing vessel of a device adapted to be towed from said vessel, a pair of detectors spaced a fixed distance apart on said device, separate means for listening to each detector and means for compensating for the difference in time of arrival of the sound to be detected at said detectors.

In witness whereof, I hereunto subscribe my name this 16th day of June A. D., 1919.

HAROLD D. ARNOLD.